United States Patent Office 3,249,135
Patented May 3, 1966

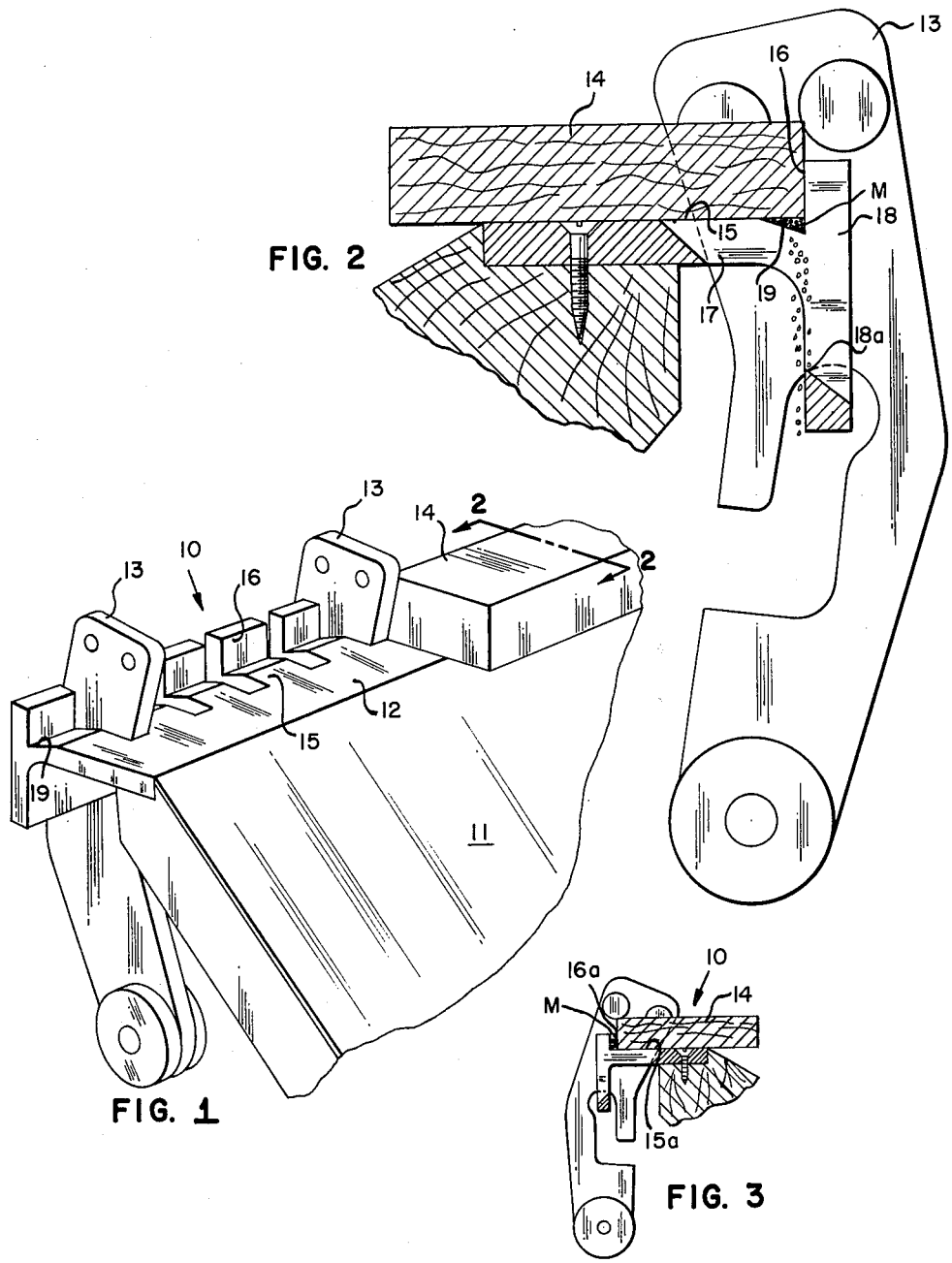

3,249,135
GAGE SUPPORT
Albert E. Leaver, Oakland, Calif., assignor to Evan Jeffreys and E. E. Firestone, both of Santa Rosa, Calif.
Filed Jan. 20, 1964, Ser. No. 338,994
4 Claims. (Cl. 143—168)

This invention relates to features for measuring and cutting a work piece of lumber, sheet metal or bar stock to a desired length. More particularly, the invention involves an improvement in gage constructions that provides straight edges against which a work piece is held while being cut.

The invention herein described is of particular utility in connection with the type of gages shown and described in United States Patents Nos. 957,779, 957,781 and 957,782. These gages essentially comprise a number of stop pieces, each pendantly supported and separately removable from a slotted support bar. The support bars may best be formed with a slotted flange that extends at right angles to the supporting surface of the bar, said flange serving as a straight edge against which the work piece may be held while being cut. One end of the work piece is simultaneously held against one of the selected stop pieces, other stop pieces along the straight edge being pivoted to positions in back of the straight edge provided by the flange. During use of these gages, chips, shavings, and other small foreign particles usually become lodged between the work piece and the straight edges, resulting in a misalignment of the work piece unless such particles are removed by frequent and periodic cleaning. Thus, the removal of foreign particles from between the work piece and the vertical surface is of decided importance to obtaining both accuracy in dimensional length and perpendicularity of cuts.

In brief, the present invention contemplates providing a recess in the support bar along the base edge of the slotted flange. When so applied to the type of gage contemplated, the recess intersects each of the spaced slots of the support bar. Any foreign particles caught between the vertical straight edge and the work piece will, as a result, first tend to collect within the reservoir space provided by the recess. Furthermore, a slight reciprocating movement of the work piece (as caused by positioning it upon a support bar) will move such collected particles along the recess toward the slots. The particles are discharged through the slots of the support bar by gravity either into a chute or onto the floor.

A primary object, therefore, is to provide an improvement for gages of the kind described which will facilitate the removal of foreign particles from in front of a straight edge surface.

It is another object of this invention to provide a gage having a slotted support bar and a vertical straight edge surface, and more particularly characterized by having a recessed groove formed along the base edge of the straight edge which serves as a reservoir for chips, shavings, dust, resin, and other foreign particles.

Other objects of this invention will become apparent in view of the following detailed description and the accompanying drawings.

In the drawings forming a part of this application and in which like parts are identified by like reference numerals throughout the same, FIG. 1 is a perspective view of a portion of a gage constructed in accordance with this teaching;

FIG. 2 is an enlarged section of a gage viewed along lines 2—2 of FIG. 1; and

FIG. 3 is an end view of a conventional gage construction, illustrating the manner in which a collection of shavings upon the supporting surface would normally impair use of a straight edge.

Referring to FIG. 1, there is shown a gage 10 mounted upon the upper end of an inclined table 11. Gage 10 essentially comprises an angle bar 12 and a number of stop pieces 13, each stop piece pivotally supported from the bar and constructed in a manner substantially the same as shown in United States Patent No. 957,779.

Angle bar 12, which is used to support as well as position the work piece 14, has a horizontal support surface 15 and a vertical stop surface 16, said surfaces coming together at a right angle corner and having complementary slots 17 and 18, respectively, formed therein. A stop piece 13 may be selectively positioned and pendantly supported upon the lower knife edge 18a of any one of the slots 18.

Slots 17 and 18 are centered along bar 12 on a standard modulus, perferably inches, and the stop pieces are selectively placed within certain pairs of complementary slots as a point of reference. A work piece may then be located any desired and preselected distance from a cut-off point with reference to a particular stop piece by abutting one end of the work piece against the required stop piece.

Referring to FIG. 2 in particular, it will be noted that the upper supporting surface 15 is further provided with a recess 19 formed at the base edge of surface 16. Recess 19 is inclined downwardly in the direction of surface 16, and consequently the depth of the reservoir created by the recess is greatest along the edge of surface 16. Since recess 19 extends along the full length of bar 12, it necessarily communicates with each pair of slots 17 and 18.

In operation, and while positioning the work piece 14 upon surface 15 against the straight edge of surface 16, any surface dust or shavings resting upon surface 15 will be scraped into recess 19. Thus, no surface material can become lodged between the work piece and surface 16 until recess 19 is filled, if such should happen. Moreover, a slight reciprocation of the work piece, and even ordinary pressure of holding the work piece against surfaces 15 and 16, will tend to extrude or move the material M collected within the recess, discharging the material through slots 17 and 18 as shown in FIG. 2. In contradistinction and with reference to FIG. 3, which illustrates a conventional gage structure 10a, there is a build-up of material M between the work piece 14 and surface 16a. As a result, and unless the surface 15a is cleaned before each measurement, there can be no assurance that the work piece will be accurately measured or properly aligned relative to a straight edge.

Although a perferred embodiment of this invention has been shown and described, it is to be understood that various changes may be made in the size and configuration of the recess without departing from the spirit of the invention or the scope of the attached claims, and each of such changes is contemplated.

What I claim and desire to secure by Letters Patent is:

1. In a gage of the type described including a support bar having a horizontal support surface and a vertical stop surface, said surfaces defining a right angle corner and said horizontal surface having slots spaced lengthwise of said bar on a modulus of approximately one inch or less, said horizontal surface also being formed with a recess extending along the base edge of said vertical surface, said recess communicating with each of said spaced slots to facilitate the removal of foreign particles.

2. In a gage as set forth in claim 1 wherein said recess is inclined downwardly in the direction of said vertical stop surface.

3. In a gage of the type described including a angle bar comprising horizontal and vertical flanges having right angle slots spaced lengthwise of the bar on a modulus of approximately one inch or less, a portion of said vertical flange extending above the upper surface of said horizontal flange and defining a straight edge stop, the upper surface of said horizontal flange being formed with a recess extending along the base edge of said vertical flange, said recess communicating with each of said spaced slots to facilitate the removal of foreign particles.

4. In a gage as set forth in claim 3 wherein said recess is inclined downwardly in the direction of said vertical flange.

No references cited.

DONALD R. SCHRAN, *Primary Examiner.*